United States Patent Office 3,055,936
Patented Sept. 25, 1962

3,055,936
NITROALKANOIC ACIDS AND ESTERS THEREOF
Martin Stiles, Ann Arbor, Mich., and Herman L. Finkbeiner, Schenectady, N.Y., assignors to Research Corporation, New York, N.Y., a corporation of New York
No Drawing. Filed Jan. 18, 1960, Ser. No. 2,818
4 Claims. (Cl. 260—526)

This invention relates to a novel method of producing α-nitroalkanoic acids and their esters from nitroalkanes.

The method of the invention comprises contacting a primary nitroalkane with a reagent of the group consisting of magnesium lower alkyl carbonates and aluminum lower alkoxides plus carbon dioxide. The reaction takes place readily at moderate temperatures, for example, from room temperature to 100° C. It is preferably effected in a non-aqueous solvent medium, such as dimethylformamide or dimethylsulfoxide.

The primary reaction product is believed to be a metal chelate compound which in the case of the magnesium compound may be formulated as follows:

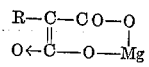

wherein R is hydrogen or an alkyl group.

The nitro acid is readily liberated from the chelate by the action of strong acids in aqueous media. Addition of a strongly acid alkanol to the reaction mixture results in the formation of the corresponding alkyl esters of the α-nitroalkanoic acid.

The α-nitro acids and their esters can be readily reduced by known methods to the corresponding amino acids, with or without intermediate isolation of the nitroacids or esters from the reaction products.

Magnesium methyl carbonate (E. Szaravasy, Ber., 30, 1836 (1897)) is particularly suitable for the method of the invention and can be conveniently made by saturating a solution of magnesium methoxide in dimethylformamide with dry carbon dioxide.

The principles of the invention are illustrated by the following specific examples:

EXAMPLE 1

*Preparation of Magnesium Methyl Carbonate (MMC) Solution.*—Four hundred eighty grams (20 moles) of magnesium turnings is added, in portions, to 8 liters of anhydrous methanol at a rate which maintains reflux. When the magnesium has completely reacted, the excess methanol is removed by heating at approximately 50° C. at water pump vacuum. When the methanol is largely removed, as indicated by the drop in pressure to approximately 20 mm., 10 liters of technical N,N-dimethylformamide (DMF) is added. Carbon dioxide is then admitted to the resulting suspension of magnesium methoxide in DMF as rapidly as it is absorbed. When the contents of the flask have become homogeneous and carbon dioxide absorption ceases, the last traces of methanol are removed by distillation, under a carbon dioxide atmosphere, through a five-cap bubble-cap column, until the stillhead temperature reaches 152° C. At this point the residual solution is cooled to room temperature and carbon dioxide is admitted with stirring for a further 3 hrs. to ensure saturation.

EXAMPLE 2

*Nitroacetic Acid.*—Three grams (0.049 mole) of nitromethane is added to 100 ml. of a 1.94 molar solution of MMC in DMF, prepared as described in Example 1, at 50° C. A slow stream of nitrogen is passed through the stirred solution at this temperature for 2 hrs. The reaction mixture is then cooled to 10° C. and poured into a mixture of 80 ml. of concentrated hydrochloric acid and 100 g. of ice overlayed with 100 ml. of ether. The layers are separated and the aqueous layer extracted over more ether. The ether extracts are combined and dried over anhydrous magnesium sulfate. After further drying over phosphorus pentoxide the ether solution is filtered and evaporated at the water pump. The residual oil crystallizes from chloroform, yielding 3.3 g. (63%) of nitroacetic acid, M.P. 89–92° C.

EXAMPLE 3

*Nitroacetic Acid.*—By substituting an equivalent quantity of aluminum isopropoxide together with about 1% of MMC or sodium methoxide as a catalyst for the MMC in Example 2 and passing carbon dioxide into the reaction mixture instead of nitrogen, the same product is obtained.

EXAMPLE 4

*α-Nitropropionic Acid.*—By substituting nitroethane for nitromethane in the procedure described in Example 2, except that a mixture of chloroform and carbon disulfide is used for crystallizing the product, there is obtained a 49% yield of α-nitropropionic acid, M.P. 59–61° C.

EXAMPLE 5

*DL-Alanine.*—Nitroethane (0.05 mole) is treated with 100 ml. of 1.94 molar MMC solution as described in Example 2 up to the evaporation of the dried ether solution. The crude nitro acid is then dissolved in 50–70 ml. of glacial acetic acid, approximately 1 gram of a 10% palladium-on-charcoal catalyst is added, and the mixture is shaken under approximately 50 p.s.i.g. hydrogen pressure until the absorption of hydrogen is complete. The catalyst is then removed by filtration and the acetic acid is removed by distillation under vacuum until the volume is less than 10 ml. Addition of ether to the residue causes precipitation of DL-alanine, which is recrystallized from aqueous ethanol. The yield is 46%, M.P. 292–294° C. dec.

EXAMPLE 6

*Glycine.*—The preparation of glycine illustrates an alternative technique for reducing the α-nitro acids. A mixture of nitromethane and MMC solution is stirred together at 50° as described in Example 2. Then the reaction mixture is cooled and added slowly to dry ether to precipitate the crude magnesium salt of nitroacetic acid. The solid salt, which is contaminated with magnesium methyl carbonate, is suspended in methanol, a platinum oxide or palladium-on-carbon catalyst is added, and hydrogenation is carried out under approximately 50 p.s.i.g. pressure. After hydrogen absorption is complete the catalyst is removed, the solution is concentrated, and the pH adjusted to approximately 6. Upon cooling glycine is obtained in approximately 50% yield based on nitromethane.

EXAMPLE 7

*DL-α-Aminobutyric Acid* is prepared from 1-nitropropane in 34% overall yield by the procedure described for DL-alanine in Example 5. The product melts at 283–285° C. dec.

EXAMPLE 8

*DL-Norvaline* is prepared in 42% yield from 1 nitrobutane by the procedure described for DL-alanine in Example 5. The product melts at 290–292° C. dec.

EXAMPLE 9

*Methyl 2-Nitro-4-Methylpentanoate (Methyl α-Nitroisocaproate).*—Ten grams of 1-nitro-3-methylbutane is treated with 250 ml. of 2 molar MMC solution at 50° C. for 7 hours during which a slow stream of nitrogen is bubbled through the solution.

The reaction mixture is then added at −60° C. to 500 ml. of dry methanol which is nearly saturated with hydrogen chloride. The resulting solution is allowed to warm to room temperature and stirred at room temperature for a further 8–12 hours. The bulk of the methanol is then removed under reduced pressure and the residue is poured into ice water and extracted with ether three times. The ether extracts are combined, dried over anhydrous magnesium sulfate, and the solvent is removed. Distillation of the residue affords a 46% yield of methyl 2-nitro-4-methylpentanoate, B.P. 57–60° C. (0.3 mm.), $n_D^{25}$ 1.4288, as a colorless liquid.

EXAMPLE 10

*DL-Leucine.*—Five grams of methyl 2-nitro-4-methylpentanoate is dissolved in 100 ml. of methanol and hydrogenated at 50 p.s.i.g. hydrogen pressure in the presence of 0.20 g. of platinum oxide catalyst. After hydrogen absorption ceases, the catalyst is removed and the methanol is distilled at reduced pressure and 30–35° C. The residue, which is the crude methyl ester of *DL*-leucine, is refluxed with 80 ml. of water for 3 hours and the solution is stirred with activated charcoal, filtered, and concentrated. Upon cooling there is obtained approximately 90% yield of *DL*-leucine, M.P. 281–282° C. (sealed tube).

EXAMPLE 11

*Methyl Nitroacetate* is prepared from nitromethane by the procedure described in Example 9. The purified material distills at 63° C. (4 mm.), $n_D^{20}$ 1.4250.

By similar procedures, 2-nitro-3-methyl-butyric acid, which can be reduced to *DL*-valine is made from 1-nitro-2-methylpropane, and 2-nitro-3-methylpentanoic acid which can be reduced to *DL*-isoleucine.

We claim:
1. A method of making compounds selected from the group consisting of lower α-nitroalkanoic acids and lower alkyl esters thereof which comprises contacting a lower primary nitroalkane with a reagent selected from the group consisting of (A) magnesium lower alkyl carbonates and (B) aluminum lower alkoxide plus carbon dioxide, and contacting the reaction product with a strong acid in a medium selected from aqueous and alkanolic media.
2. A method of making a lower α-nitroalkanoic acid which comprises contacting a lower primary nitroalkane with a magnesium lower alkyl carbonate and contacting the reaction product with a strong acid in an aqueous medium.
3. A method of making a lower α-nitroalkanoic acid which comprises contacting a lower primary nitroalkane with magnesium methyl carbonate and contacting the reaction product with a strong acid in an aqueous medium.
4. A method of making magnesium salts of lower nitroalkanoic acids which comprises contacting a lower primary nitroalkane with a magnesium lower alkyl carbonate.

References Cited in the file of this patent

UNITED STATES PATENTS 2,570,297     Weisblat et al. _____ Oct. 9, 1951

OTHER REFERENCES

Beilstein: Handbuch der Organische Chemie, volume 2, 2nd Supplement, page 207, (1943).

Szarvasy: Ber. Deutsche Chemische Gesellschaft, volume 30, pages 1836–39, (1897).

Fieser et al.: Organic Chemistry, 2nd edition, page 126, (1950).

(Copies of above publications in Pat. Off. Sci. Lib.)